United States Patent
Yamamoto et al.

(10) Patent No.: US 10,436,162 B2
(45) Date of Patent: Oct. 8, 2019

(54) FUEL INJECTION DEVICE

(71) Applicant: DENSO CORPORATION, Kariya, Aichi-pref. (JP)

(72) Inventors: Shinsuke Yamamoto, Kariya (JP); Eiji Itoh, Kariya (JP); Kouichi Mochizuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 15/519,349

(22) PCT Filed: Nov. 2, 2015

(86) PCT No.: PCT/JP2015/005500
§ 371 (c)(1),
(2) Date: Apr. 14, 2017

(87) PCT Pub. No.: WO2016/072081
PCT Pub. Date: May 12, 2016

(65) Prior Publication Data
US 2017/0226975 A1 Aug. 10, 2017

(30) Foreign Application Priority Data

Nov. 5, 2014 (JP) .................. 2014-225110

(51) Int. Cl.
*F02M 51/06* (2006.01)
*F02M 61/10* (2006.01)
(Continued)

(52) U.S. Cl.
CPC ......... *F02M 51/0653* (2013.01); *F02D 41/20* (2013.01); *F02D 41/402* (2013.01);
(Continued)

(58) Field of Classification Search
CPC ........... F02M 51/0653; F02M 51/0685; F02M 61/10; F02D 41/20; F02D 41/402; F02D 2041/2048; F02D 2041/2058; Y02T 10/44
(Continued)

(56) References Cited

U.S. PATENT DOCUMENTS

| 5,959,825 A * | 9/1999 | Harcombe ............. F02D 41/20 361/152 |
| 2003/0111061 A1* | 6/2003 | Coldren ................. F02D 41/20 123/514 |

(Continued)

FOREIGN PATENT DOCUMENTS

WO 2013/191267 12/2013

*Primary Examiner* — Joseph J Dallo
*Assistant Examiner* — Yi-Kai Wang
(74) *Attorney, Agent, or Firm* — Nixon & Vanderhye PC

(57) ABSTRACT

A current control unit in a fuel injection device controls a magnitude of a current flowing through a coil during single energization. A current Ip1 flows once a signal input to the current control unit is turned ON at time t11. As a result, a movable core and a needle abut against each other with a lift amount increased at time t12, and then the needle is separated from a valve seat and pre-injection is performed. At time t13, which follows the pre-injection, the needle and movable core lift amount becomes a lift amount D1 at a time when the needle and the valve seat abut against each other, and temporary valve closing occurs. At time t14, which follows time t13, currents Ix1 and Im1 larger than the current Ip1 are caused to flow through the coil, and then main injection is performed with the needle and movable core lift amount turned into a lift amount D2 larger than the lift amount D1. Therefore, fuel injection can be performed twice during the single energization.

35 Claims, 11 Drawing Sheets

(51) Int. Cl.
*F02D 41/20* (2006.01)
*F02D 41/40* (2006.01)

(52) U.S. Cl.
CPC ........ *F02M 51/0685* (2013.01); *F02M 61/10* (2013.01); *F02D 2041/2048* (2013.01); *F02D 2041/2058* (2013.01); *Y02T 10/44* (2013.01)

(58) Field of Classification Search
USPC ........................................................ 123/472
See application file for complete search history.

(56) References Cited

U.S. PATENT DOCUMENTS

| | | | |
|---|---|---|---|
| 2005/0269432 A1* | 12/2005 | Nishiwaki | F02M 51/0685 239/585.1 |
| 2009/0289131 A1 | 11/2009 | Shingu et al. | |
| 2010/0096473 A1* | 4/2010 | Coldren | F02M 45/08 239/90 |
| 2015/0275723 A1* | 10/2015 | Koch | F02D 13/0249 60/605.2 |
| 2016/0076498 A1* | 3/2016 | Aono | F02D 41/2467 123/490 |
| 2016/0177855 A1* | 6/2016 | Kusakabe | F02D 41/20 123/490 |

* cited by examiner

FUEL INJECTION DEVICE

CROSS REFERENCE TO RELATED APPLICATION

This application is the U.S. national phase of International Application No. PCT/JP2015/005500 filed Nov. 2, 2015 which designated the U.S. and claims priority to Japanese Patent Application No. 2014-225110 filed on Nov. 5, 2014, the entire contents of which are hereby incorporated herein by reference.

TECHNICAL FIELD

The present disclosure relates to a fuel injection device injecting and supplying a fuel into a combustion chamber of an internal combustion engine (hereinafter, referred to as an "engine").

BACKGROUND ART

Conventionally, fuel injection devices are known by which a fuel in a housing is injected by an injection hole in the housing being opened and closed as a result of a reciprocating movement of a needle. Examples of these fuel injection devices include the fuel injection device that is disclosed in Patent Literature 1 and this fuel injection device is provided with a current control unit that performs main energization and preliminary energization, the main energization being to cause a current to flow through a coil so that the needle is separated from a valve seat formed around the injection hole and the preliminary energization being to cause a current to flow through the coil so that a constant distance is maintained between a movable core and a fixed core before the main energization.

In the fuel injection device that is disclosed in Patent Literature 1, the preliminary energization and the main energization are performed in the form of continuous energization, and thus fuel injection is performed only once during the single and continuous energization. However, divided injection that allows fuel injection to be performed multiple times is in demand as a function of fuel injection devices for realizing high-accuracy engine control. In a case where fuel injection is performed multiple times by the fuel injection device that is disclosed in Patent Literature 1 continuous energization including the preliminary energization and the main energization needs to be performed as many times as the fuel injection is performed, which results in an increase in energy consumption that is attributable to the multiple energization sessions following one after another.

PRIOR ART LITERATURES

Patent Literature

Patent Literature 1: Japanese Patent No. 4637931

SUMMARY OF INVENTION

An object of the present disclosure is to provide a fuel injection device ensuring a divided fuel injection during a single energization along with a reduction in electric power consumption.

A fuel injection device according to an aspect of the present disclosure, which injects a fuel into a combustion chamber of an internal combustion engine, includes a housing, a needle member, a flange portion, a movable core, a regulating unit, a fixed core, a coil, a biasing unit, and a current control unit.

The needle member is disposed to be capable of a reciprocating movement in the housing and opens and closes an injection hole by performing valve closing when one end portion abuts against a valve seat and performing valve opening when the end portion is separated from the valve seat.

The flange portion is disposed radially outside the other end portion of the needle member to be capable of an integrated reciprocating movement with the needle member.

The regulating unit is disposed radially outside the needle member or on an inner wall of the housing to be capable of an integrated reciprocating movement with the needle member on the valve seat side of the movable core, the regulating unit being formed to be capable of regulating a movement of the movable core in a valve-closing direction by abutting against the movable core.

The current control unit controls a current flowing through the coil.

In the fuel injection device according to the present disclosure, a gap is formed between the flange portion and the movable core when the regulating unit and the movable core abut against each other. In addition, in the fuel injection device according to the present disclosure, the current control unit is capable of adjusting a magnitude of the current flowing through the coil such that the fuel injection is performed multiple times during single energization.

In the fuel injection device according to the present disclosure, the gap is formed between the flange portion and the movable core when the regulating unit and the movable core abut against each other. When the current flows through the coil during the valve opening, the movable core abuts against the flange portion after moving while accelerating in a valve-opening direction by using the gap. As a result, the needle can be subjected to a relatively large force in the valve-opening direction.

In the fuel injection device according to the present disclosure, the current control unit is capable of adjusting the magnitude of the current flowing through the coil during the single energization. Herein, the "single energization" refers to energization that is performed until the current becomes zero after the current begins to flow through the coil and then the current exceeding zero continues to flow. Accordingly, movements of the needle member and the movable core in the housing can be controlled and the fuel injection can be performed multiple times during the single energization. Therefore, in the fuel injection device according to the present disclosure, the amount of the energy that is required for the fuel injection can be reduced and the fuel injection can be divided unlike in a fuel injection device disclosed in, for example, Patent Literature 1, in which continuous energization including preliminary energization and main energization needs to be performed as many times as fuel injection is performed for the fuel injection to be performed multiple times.

BRIEF DESCRIPTION OF DRAWINGS

The above-described purpose and the other purposes of the present disclosure, as well as the features and advantages of the present disclosure, will be further clarified in the following detailed description and with reference to accompanying drawings.

DESCRIPTION OF EMBODIMENTS

Figure 1:
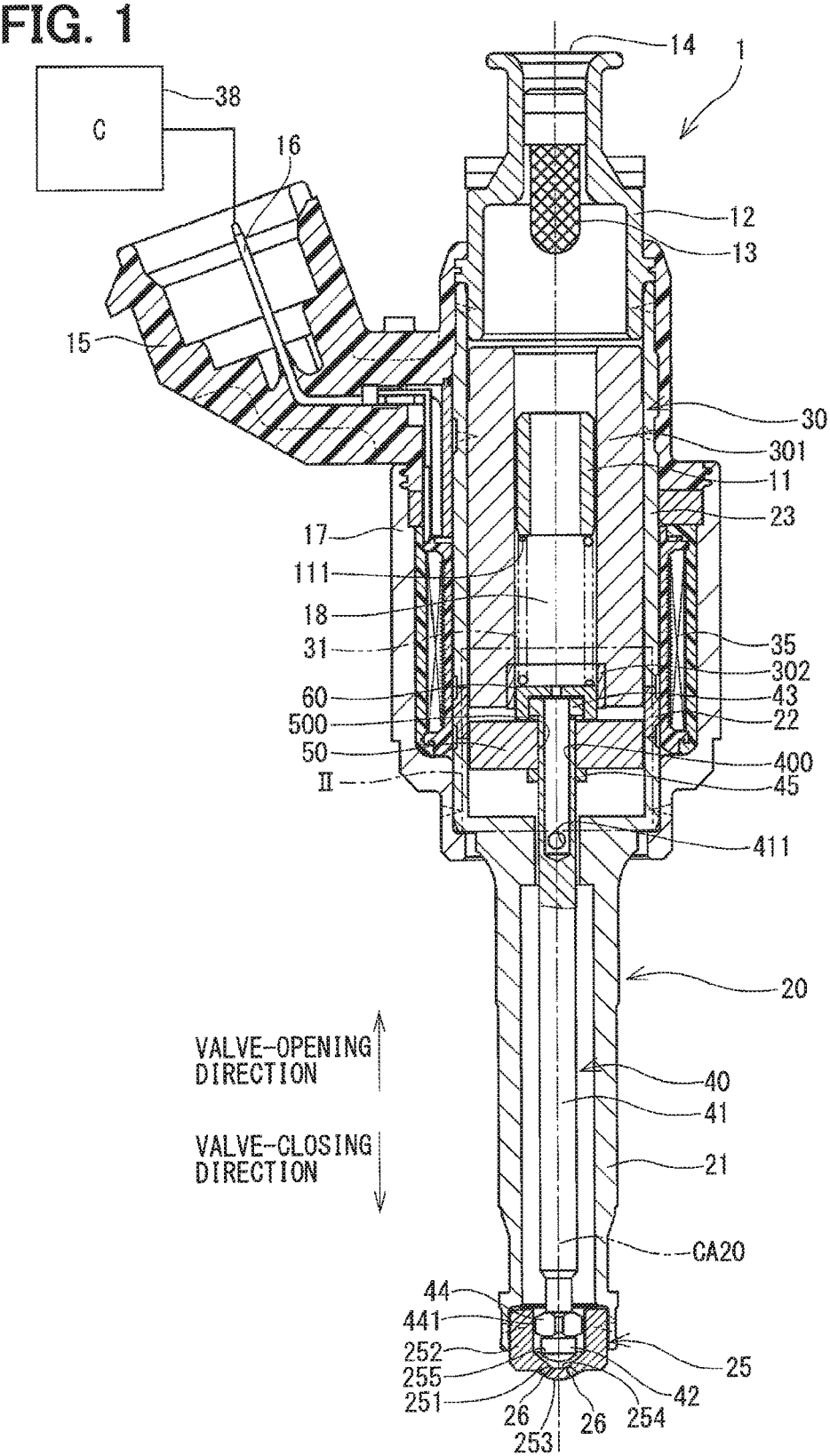
FIG. 1 is a cross-sectional view of a fuel injection device according to a first embodiment of the present disclosure.

Hereinafter, embodiments of the present disclosure will be described with reference to drawings.
(First Embodiment)

A fuel injection device 1 according to a first embodiment of the present disclosure is illustrated in FIGS. 1 to 6. A valve-opening direction and a valve-closing direction are illustrated in FIGS. 1, 2, 4, and 5, the valve-opening direction being a direction in which a needle 40 is separated from a valve seat 255 and the valve-closing direction being a direction in which the needle 40 abuts against the valve seat 255.

The fuel injection device 1 is used in, for example, a direct-injection gasoline engine (not illustrated). The fuel injection device 1 injects and supplies gasoline as a fuel into the engine at a high pressure. The fuel injection device 1 is provided with a housing 20, the needle 40, a movable core 50, a fixed core 30, a bottomed cylindrical member 60, a coil 35, a spring 31 as a "biasing unit", a current control unit 38, and the like.

A first cylinder member 21, a second cylinder member 22, a third cylinder member 23, and an injection nozzle 25 constitute the housing 20. Each of the first cylinder member 21, the second cylinder member 22, and the third cylinder member 23 is formed in a cylindrical shape, and the first cylinder member 21, the second cylinder member 22, and the third cylinder member 23 are coaxially placed in this order and are interconnected.

A magnetic material such as ferritic stainless steel forms the first cylinder member 21 and the third cylinder member 23 with a magnetic stabilization treatment performed on the first cylinder member 21 and the third cylinder member 23. The first cylinder member 21 and the third cylinder member 23 have a relatively low level of hardness. A non-magnetic material such as austenitic stainless steel forms the second cylinder member 22. The second cylinder member 22 is higher in hardness than the first cylinder member 21 and the third cylinder member 23.

The injection nozzle 25 is disposed in an end portion of the first cylinder member 21 on the side opposite to the second cylinder member 22. The injection nozzle 25 is formed in a bottomed cylindrical shape, is formed by a metal such as martensitic stainless steel being used, and is welded to the first cylinder member 21. The injection nozzle 25 is subjected to a quenching treatment so that predetermined hardness is given to the injection nozzle 25. An injection portion 251 and a cylinder portion 252 form the injection nozzle 25.

The injection portion 251 is axisymmetrically formed with a central axis CA20 of the housing 20, which is coaxial with a central axis of the fuel injection device 1, being an axis of symmetry. An outer wall 253 of the injection portion 251 is formed to protrude in the central axis CA20 direction from an inner portion of the injection nozzle 25. The injection portion 251 has multiple injection holes 26 that allow an inside and an outside of the housing 20 to communicate with each other. The valve seat 255, which is formed around the injection holes 26, is disposed in an inner wall 254 of the injection portion 251.

The cylinder portion 252, which surrounds a radial outside of the injection portion 251, is disposed to extend in the direction opposite to the direction in which the outer wall 253 of the injection portion 251 protrudes. One end portion of the cylinder portion 252 is connected to the injection portion 251 and the other end portion of the cylinder portion 252 is connected to the first cylinder member 21.

A metal such as martensitic stainless steel forms the needle 40. The needle 40 is subjected to a quenching treatment so that hardness comparable to the hardness of the injection nozzle 25 is given to the needle 40.

The needle 40 is accommodated in the housing 20 to be capable of a reciprocating movement. A shaft portion 41, a seal portion 42 as "one end portion of a needle member", a flange portion 43, a regulating unit 45, and so on form the needle 40. The shaft portion 41, the seal portion 42, the flange portion 43, and the regulating unit 45 are formed in an integrated manner to be capable of a reciprocating movement. The shaft portion 41 and the seal portion 42 are equivalent to the "needle member".

The shaft portion 41 is a rod-shaped portion and an end portion of the shaft portion 41 on the fixed core 30 side is formed in a cylindrical shape. A flow channel 400, through which the fuel can flow, is formed in the end portion of the shaft portion 41 on the fixed core 30 side. The flow channel 400 communicates with a hole 411 in the shaft portion 41 on the valve seat 255 side of the flow channel 400. In other words, the hole 411 allows the flow channel 400 and an outside of the shaft portion 41 to communicate with each other.

The shaft portion 41 has a communication passage 410 for communication between a gap 430 (described later) and the flow channel 400. The fuel in the gap 430 flows through the communication passage 410.

The seal portion 42 is disposed in an end portion of the shaft portion 41 on the valve seat 255 side to be capable of abutting against the valve seat 255. The needle 40 opens and closes the injection holes 26 by performing valve opening when the seal portion 42 is separated from the valve seat 255 and by performing valve closing when the seal portion 42 abuts against the valve seat 255.

A sliding contact portion 44 is formed between the shaft portion 41 and the seal portion 42. The sliding contact portion 44 is formed in a cylindrical shape and has a partially-chamfered portion on an outer wall 441. The part of the outer wall 441 of the sliding contact portion 44 that is not chamfered is capable of sliding contact with an inner wall of the injection nozzle 25. Accordingly, the reciprocating movement of the needle 40 in the end portion on the valve seat 255 side is guided.

The flange portion 43 is formed in a substantially toric shape and is disposed radially outside the end portion of the shaft portion 41 on the fixed core 30 side. The flange portion 43 is formed to be larger in outer diameter than the shaft portion 41.

The regulating unit 45, which is formed in a substantially toric shape, is disposed radially outside the shaft portion 41 on the valve seat 255 side of the flange portion 43 and at a position at a predetermined distance from the flange portion 43. The regulating unit 45 is formed to be larger in outer diameter than the shaft portion 41. The movable core 50 is disposed to be capable of a reciprocating movement between a regulating unit first end face 451 of the regulating unit 45 on the fixed core 30 side and a flange portion end face 431 of the flange portion 43 on the valve seat 255 side.

The movable core 50 is formed in a cylindrical shape and a magnetic material such as ferritic stainless steel forms the movable core 50. The movable core 50 is disposed to be capable of moving relative to the needle 40.

The movable core 50 has a movable core through hole 500 into which the shaft portion 41 is inserted. A movable core first end face 501 of the movable core 50 on the fixed core 30 side is formed to be capable of abutting against the flange portion end face 431. A movable core second end face 502 of the movable core 50 on the valve seat 255 side is formed to be capable of abutting against the regulating unit first end face 451. When the regulating unit first end face 451 and the movable core second end face 502 abut against each other, the gap 430 is formed between the flange portion end face 431 and the movable core first end face 501.

The fixed core 30 is welded to the third cylinder member 23 of the housing 20 and is disposed to be fixed inside the housing 20. The fixed core 30 has a fixed core main body portion 301 and a fixed core abutting portion 302.

The fixed core main body portion 301 is formed in a cylindrical shape and a magnetic material such as ferritic stainless steel forms the fixed core main body portion 301. The fixed core main body portion 301 is disposed in a magnetic field formed by the coil 35 (described later) with a magnetic stabilization treatment performed on the fixed core main body portion 301.

The fixed core abutting portion 302 is a cylindrical member that is disposed on an inner side of the valve seat 255 side of the fixed core main body portion 301. The fixed core abutting portion 302 has hardness comparable to hardness of the movable core 50. An end face 303 of the fixed core abutting portion 302 on the valve seat 255 side is positioned to be closer to the valve seat 255 side than an end face 304 of the fixed core main body portion 301 on the valve seat 255 side is. Accordingly, when the movable core 50 moves in the valve-opening direction, the movable core first end face 501 of the movable core 50 and the end face 303 abut against each other and the movement of the movable core 50 in the valve-opening direction is regulated.

The bottomed cylindrical member 60 is disposed on the side of the movable core 50 opposite to the valve seat 255 and inside the fixed core abutting portion 302 to be capable of a reciprocating movement with respect to the fixed core 30. A disc portion 61 and a cylinder portion 62 constitute the bottomed cylindrical member 60. The disc portion 61 and the cylinder portion 62 are integrally formed.

The disc portion 61 is positioned on the side of the flange portion 43 opposite to the valve seat 255. The disc portion 61 is formed such that its cross section perpendicular to the central axis CA20 has a circular shape. An end face 611 of the disc portion 61 on the valve seat 255 side is formed to be capable of abutting against an end face 412 of the shaft portion 41 on the side opposite to the valve seat 255 and an end face 432 of the flange portion 43 on the side opposite to the valve seat 255.

A communication passage 612, which allows an inside and an outside of the bottomed cylindrical member 60 to communicate with each other, is formed in the disc portion 61. The communication passage 612 constitutes a fuel passage 18 (described later), and the fuel inside the bottomed cylindrical member 60 is discharged to the outside from the bottomed cylindrical member 60 as a result of a movement of the flange portion 43.

The cylinder portion 62 is a cylinder portion that is formed to extend toward the valve seat 255 from a radial outside of the disc portion 61. An inner wall 621 of the cylinder portion 62 is formed to be capable of sliding with respect to an outer wall 433 radially outside the flange portion 43. The inner wall 621 and the outer wall 433 have the same level of hardness. An outer wall 622 of the cylinder portion 62 is disposed to be capable of sliding with respect to an inner wall 305 of the fixed core abutting portion 302. The outer wall 622 and the inner wall 305 have the same level of hardness.

One end portion of the cylinder portion 62 is fixed to the disc portion 61. The other end portion of the cylinder portion 62 is disposed to be capable of abutting against the movable core 50. The cylinder portion 62 has a length that allows the flange portion 43 to perform a reciprocating movement inside the bottomed cylindrical member 60.

The coil 35, which is formed in a cylindrical shape, is disposed to surround mainly the second cylinder member 22 and the third cylinder member 23 from a radially outer side. The magnetic field is formed around the coil 35 when a current flows. Once the magnetic field is formed, a magnetic circuit is formed in the fixed core 30, the movable core 50, the first cylinder member 21, and the third cylinder member 23.

The spring 31 is disposed such that one end of the spring 31 abuts against an end face 613 of the disc portion 61 on the side opposite to the valve seat 255. The other end of the spring 31 abuts against an end face 111 of an adjusting pipe 11 on the valve seat 255 side, the adjusting pipe 11 being press-fitted and fixed inside the fixed core 30. The spring 31 biases the needle 40 and the movable core 50 via the bottomed cylindrical member 60 toward the valve seat 255, that is, in the valve-closing direction.

A cylindrical fuel introduction pipe 12 is press-fitted and welded in an end portion of the third cylinder member 23 opposite to the second cylinder member 22 side. A filter 13 is disposed inside the fuel introduction pipe 12. The filter 13 collects foreign matter contained in the fuel that flows in from an introduction port 14 of the fuel introduction pipe 12.

Radially outer sides of the fuel introduction pipe 12 and the third cylinder member 23 are molded with a resin. A connector 15 is formed at the mold part. A terminal 16 for electric power supply to the coil 35 is insert molded in the connector 15. The current control unit 38 is electrically connected to the terminal 16. A cylindrical holder 17, which covers the coil 35, is disposed radially outside the coil 35.

The current control unit 38 is electrically connected to an external electric power source (not illustrated) and an electronic control unit (hereinafter, referred to as an "ECU") in a vehicle equipped with the engine. The current control unit 38 controls a magnitude of the current flowing through the coil 35, a duration of the current flow, and so on in response to a command output from the ECU and based on, for example, signals from various sensors attached to the vehicle.

The fuel that flows in from the introduction port 14 of the fuel introduction pipe 12 flows inside the fixed core 30, inside the adjusting pipe 11, through the flow channel 400 and the hole 411, and between the first cylinder member 21 and the shaft portion 41 and is directed toward the inner portion of the injection nozzle 25. In other words, the path between the introduction port 14 of the fuel introduction pipe 12 and the space between the first cylinder member 21 and the shaft portion 41 of the needle 40 is the fuel passage 18 through which the fuel is introduced into the injection nozzle 25.

Figure 2:
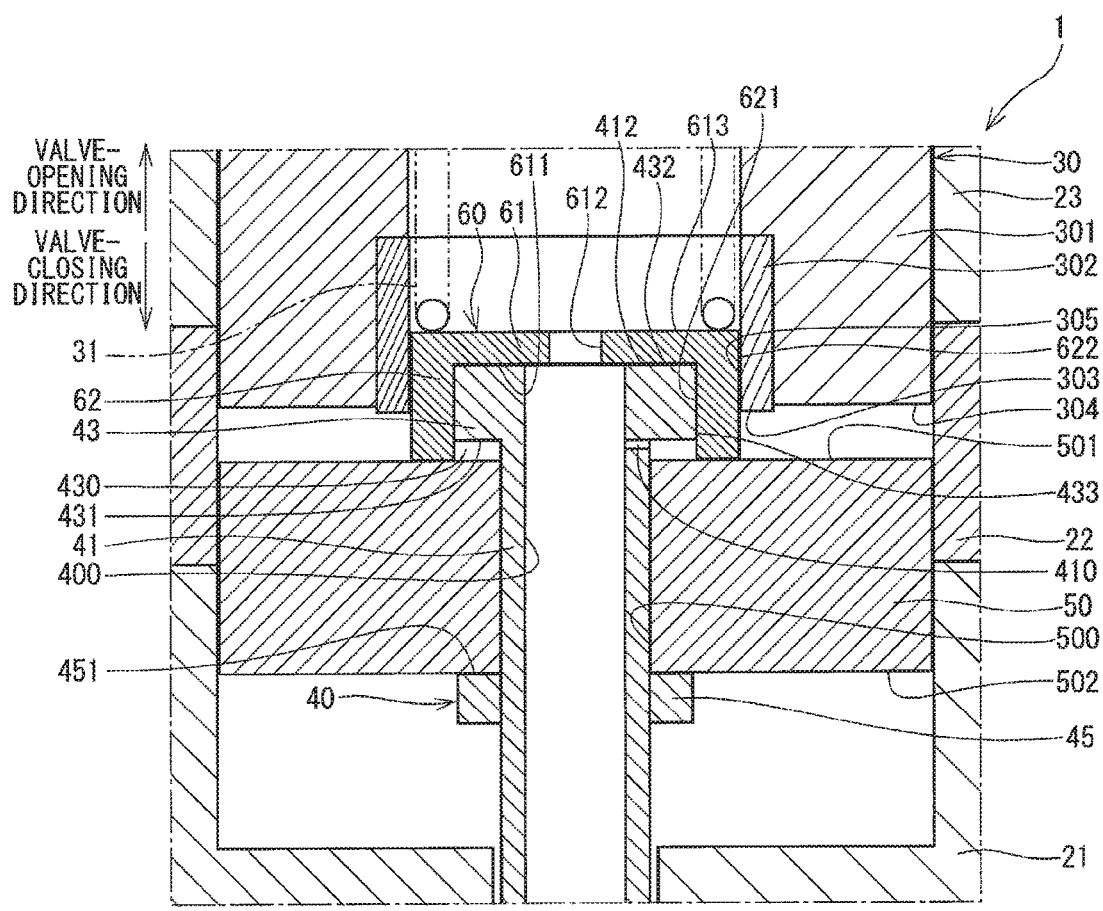
FIG. 2 is an enlarged view of a section II in FIG. 1.
Figure 3:
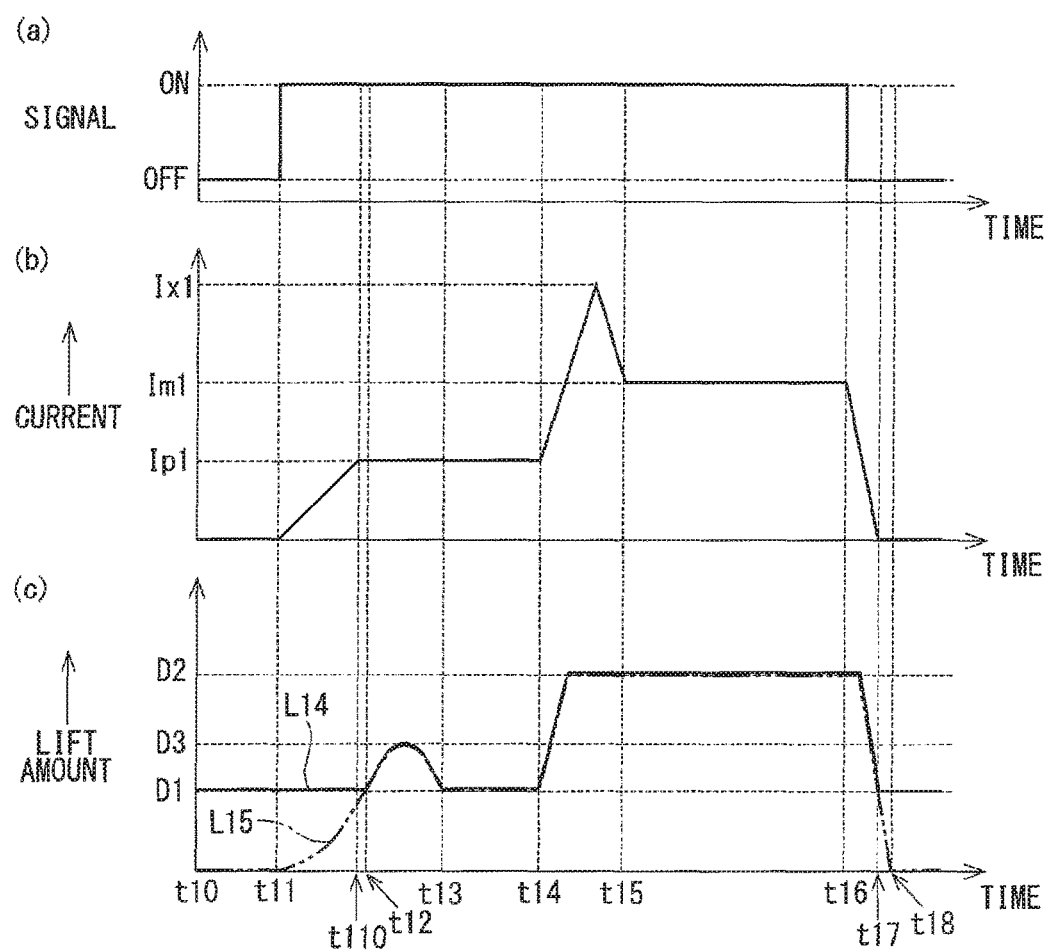
FIG. 3 is a time chart related to fuel injection by the fuel injection device according to the first embodiment of the present disclosure.
Figure 4:
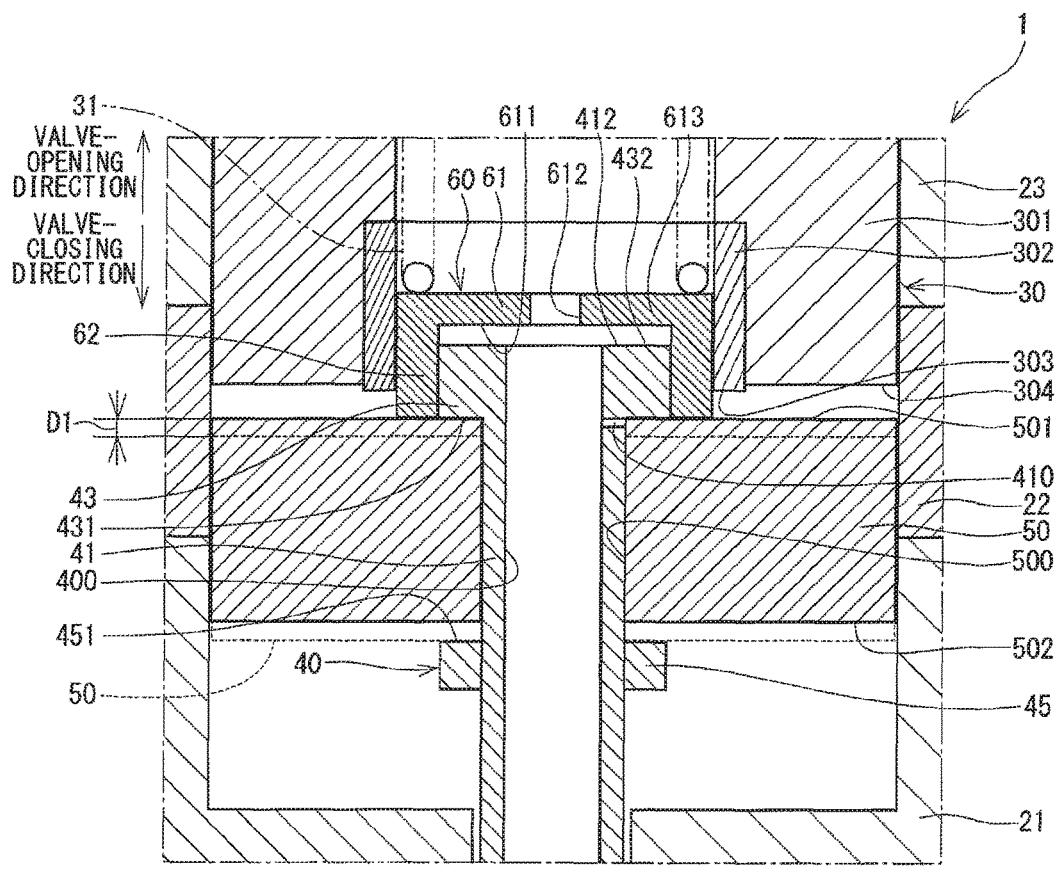
FIG. 4 is an enlarged view of the section II in FIG. 1 illustrating an effect differing from that illustrated in FIG. 2.
Figure 5:
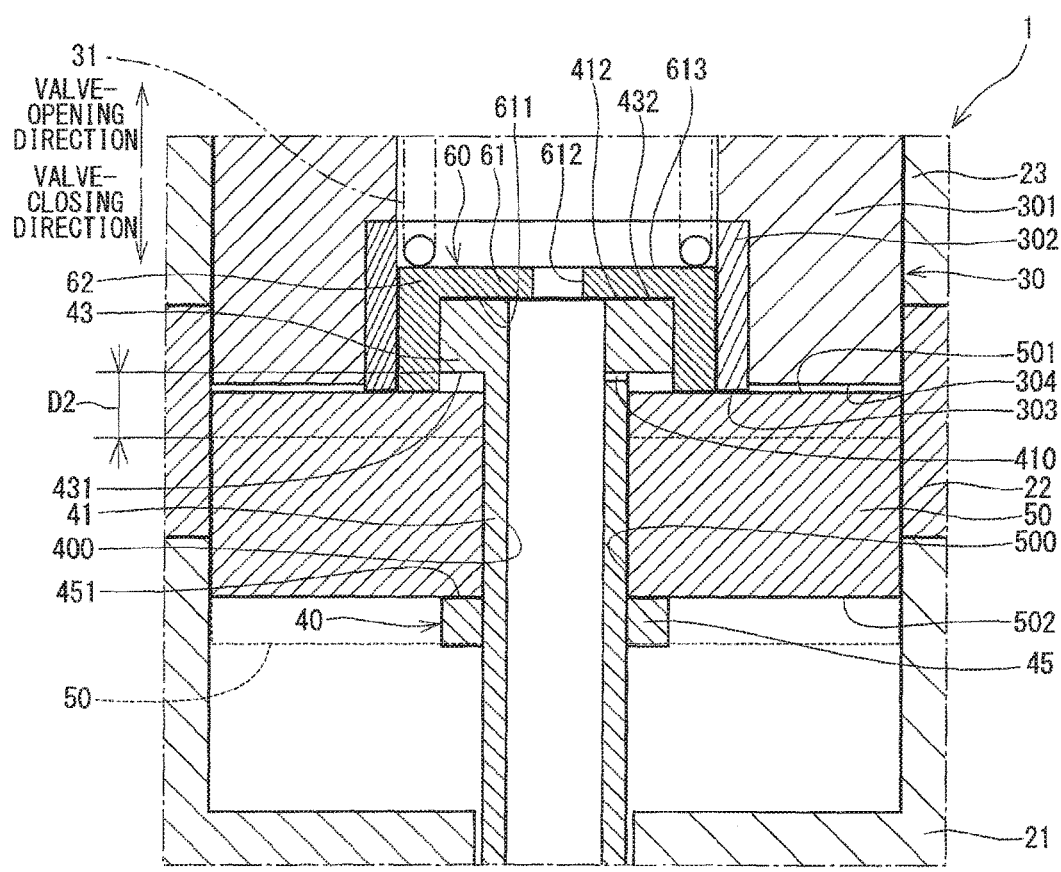
FIG. 5 is an enlarged view of the section II in FIG. 1 illustrating an effect differing from those illustrated in FIGS. 2 and 4.
Figure 6:
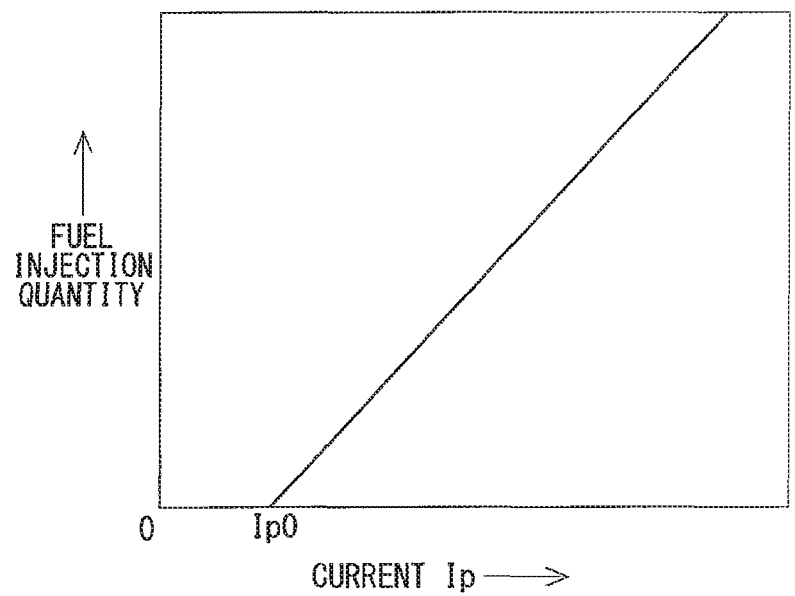
FIG. 6 is a characteristic diagram illustrating a relationship between a magnitude of a current and a fuel injection quantity with regard to the fuel injection device according to the first embodiment of the present disclosure.

An effect of the fuel injection device 1 will be described below with reference to FIGS. 2 to 6. FIGS. 2, 4, and 5 are enlarged views illustrating a main section of the fuel injection device 1, in which positional relationships among the movable core 50, the needle 40, and the fixed core 30 before and after fuel injection are illustrated. FIG. 3 is a time chart related to the fuel injection by the fuel injection device 1. ON and OFF of a signal that is output from the ECU to the current control unit 38 are illustrated in (a) of FIG. 3. The magnitude of the current that flows through the coil 35 is illustrated in (b) of FIG. 3. A lift amount of the needle 40 (solid line L14) and a lift amount of the movable core 50 (two-dot chain line L15) are illustrated in (c) of FIG. 3. The lift amount of the needle 40 at a certain time means a distance between the position of the movable core first end face 501 in the state that is illustrated in FIG. 2 and the position of the flange portion end face 431 at the certain time. The lift amount of the movable core 50 at a certain time means a distance between the position of the movable core first end face 501 in the state that is illustrated in FIG. 2 and the position of the movable core first end face 501 at the certain time. FIG. 6 is a characteristic diagram illustrating a relationship between the magnitude of the current that flows through the coil 35 in the fuel injection device 1 and a fuel injection quantity. In FIGS. 4 and 5, the position of the movable core 50 that is illustrated in FIG. 2 is illustrated by dotted lines so that the description can be better understood.

The signal that the ECU outputs to the current control unit 38 remains OFF when no electric power is supplied to the coil 35, that is, from time t10 to time t11 illustrated in FIG. 3. At this time, no current is supplied to the coil 35 and the needle 40, the movable core 50, and the fixed core 30 have the positional relationship that is illustrated in FIG. 2. Specifically, the regulating unit first end face 451 and the movable core second end face 502 abut against each other because of a biasing force of the spring 31 acting on the needle 40 and the movable core 50. At this time, the gap 430 is formed between the movable core first end face 501 and the flange portion end face 431. In addition, because no magnetic attraction force is generated between the fixed core 30 and the movable core 50, a gap is formed between the end face 303 of the fixed core abutting portion 302 and the movable core first end face 501.

Once the signal that the ECU outputs to the current control unit 38 is turned ON at time t11 a current Ip1 as a "first current" flows through the coil 35 at time t110. This results in magnetic attraction force generation between the fixed core 30 and the movable core 50 and the lift amount of the movable core 50 increases as illustrated by the two-dot chain line L15. At this time, the movable core 50 moves in the valve-opening direction, while accelerating over a distance equivalent to the length of the gap 430 in the central axis CA20 direction, and thus a relatively large force in the valve-opening direction acts on the needle 40 (time t12 in FIG. 3) when the movable core first end face 501 and the flange portion end face 431 abut against each other as illustrated in FIG. 4. The lift amount of the movable core 50 at this time is a lift amount D1 as illustrated in FIG. 4.

After the movable core first end face 501 and the flange portion end face 431 abut against each other, the needle 40 and the movable core 50 move in the valve-opening direction, in an integrated manner and against the biasing force of the spring 31, because of an inertial force of the movable core 50. As a result, the needle 40 and the valve seat 255 are separated from each other and the injection holes 26 are opened. Once the injection holes 26 are opened, the fuel in the injection nozzle 25 is injected through the injection holes 26. Hereinafter, the fuel injection that is performed when the current Ip1 flows through the coil 35 will be referred to as pre-injection.

Although the needle 40 and the movable core 50 move to some extent in the valve-opening direction starting from time t12 because of the inertial force of the movable core 50, the needle 40 and the movable core 50 move in the valve-closing direction once the biasing force of the spring 31 exceeds that inertial force, and then the needle 40 and the valve seat 255 abut against each other and the injection holes 26 are closed at time t13.

During the pre-injection by the fuel injection device 1 according to the first embodiment, the needle 40 and the movable core 50 are lifted to the extent of the end face 412 of the shaft portion 41 and the end face 432 of the flange portion 43 not abutting against the end face 611 of the disc portion 61. Specifically, referring to the lift amount of the needle 40 at a time when the end face 412 of the shaft portion 41 and the end face 432 of the flange portion 43 abut against the end face 611 of the disc portion 61 as a lift amount D2 (refer to FIG. 5) as a "maximum lift amount", the lift amount of the needle 40 between time t12 and time t13 is a lift amount D3, which is smaller than the lift amount D2. The lift amount D3 is equivalent to a "lift amount smaller than the maximum lift amount".

In the fuel injection device 1, the current control unit 38 is capable of changing the lift amount of the needle 40 by changing the magnitude of the current Ip1 in response to vehicle driving situations. Accordingly, the fuel injection quantity during the pre-injection can be changed. Specifically, when the current Ip1 is increased in a range of at least a current Ip0 as illustrated in FIG. 6, the fuel injection quantity during the pre-injection increases as a result of the increase in the current Ip1.

Once the signal that is output by the ECU is turned ON at time t11 the current Ip1 flows through the coil 35 (starting from time t110 in FIG. 3). As a result, the injection holes 26 in the fuel injection device 1 are closed at time t13, and then a state where the movable core 50 and the needle 40 abut against each other is maintained from time t13 to time t14, when the magnitude of the current is changed next time. The current control unit 38 is capable of adjusting the duration of the flow of the current Ip1 through the coil 35, that is, the period from time t110 to time t14, in response to vehicle driving situations.

At time t14, the current control unit 38 causes the current flowing through the coil 35 to exceed the current Ip1. More specifically, the current control unit 38 causes a relatively large current Ix1 to flow first as a "second current", and then causes a current Im1 to flow through the coil 35 (time t15 in FIG. 3), the current Im1 being smaller than the current Ix1 and larger than the current Ip1. As a result, the needle 40 and the movable core 50 move in the valve-opening direction and the injection holes 26 are opened again. Once the injection holes 26 are opened, the fuel in the injection nozzle 25 is injected through the injection holes 26. Hereinafter, the fuel injection that is performed when the current Im1 flows through the coil 35 will be referred to as main injection. The lift amount of the needle 40 during the main injection is the lift amount D2 (refer to FIG. 5), which is the maximum lift amount of the needle 40 in the fuel injection device 1.

Once the signal that the ECU outputs to the current control unit 38 is turned OFF at time t16, the current that flows through the coil 35 becomes zero. The needle 40 and the movable core 50 move in the valve-closing direction because of the biasing force of the spring 31. The needle 40 and the valve seat 255 abut against each other, causing the injection holes 26 to be closed and the needle 40 to stop (time 117 in FIG. 3). After time t17, the movable core 50 further moves in the valve-closing direction and stops by abutting against the regulating unit 45 (time t18 in FIG. 3).

In this manner, the fuel injection device 1 according to the first embodiment performs small-large double injection control, which is control for the main injection to be performed after the pre-injection is performed during single energization. After the signal that the ECU outputs to the current control unit 38 is turned OFF, the fuel injected and supplied into a combustion chamber of the engine is ignited by an ignition plug and burned.

(a) In the fuel injection device 1 according to the first embodiment, the gap 430 is formed between the flange portion end face 431 and the movable core first end face 501 when the regulating unit first end face 451 and the movable core second end face 502 abut against each other. Once the current flows through the coil 35 in the fuel injection device 1, the movable core 50 abuts against the needle 40 while accelerating over the distance equivalent to the length of the gap 430 in the central axis CA20 direction. Accordingly, in the fuel injection device 1, the needle 40 can be subjected to a relatively large force in the valve-opening direction.

(b) In the fuel injection device that is disclosed in, for example, Patent Literature 1, in which fuel injection can be performed only once during single energization, electrical energy supplied to a coil needs to be charged as many times as fuel injection is performed, so that valve opening is performed as many times as the fuel injection is performed, in a case where the fuel injection is performed multiple times by the fuel injection device for an air-fuel mixture suitable for desired combustion to be formed in a combustion chamber. Therefore, electrical energy consumption increases.

The current control unit 38 in the fuel injection device 1 according to the first embodiment performs the small-large double injection control during the "single energization" that lasts from time t11, when the current begins to flow through the coil 35, until time t17, when the current becomes zero after a continuous flow of the current exceeding zero, the small-large double injection control being to cause the current Im1 exceeding the current Ip1 to flow through the coil 35 for the lift amount of the needle 40 to become the lift amount D2 after the current Ip1 is caused to flow so that the lift amount of the needle 40 becomes the lift amount D3. Accordingly, in the fuel injection device 1, the pre-injection for injecting a relatively small amount of the fuel and the main injection for injecting a relatively large amount of the fuel can be performed during the single energization. Therefore, the amount of the energy that is required for the fuel injection can be reduced in comparison to the fuel injection device in which the electrical energy needs to be charged multiple times for the multiple fuel injection sessions.

(c) In the fuel injection device in which the charging of the electrical energy is repeated the same number of times as the fuel injection for the repeated fuel injection, time for electrical energy charging is required with respect to each of the multiple fuel injection sessions. During the multiple fuel injection sessions, however, it is hard to have a sufficient length of time for the charging of the electrical energy required for the next fuel injection session that follows one fuel injection session. In the fuel injection device 1, in contrast, the fuel injection can be performed multiple times and successively during the single energization by the magnitude of the current being controlled, and the charging of the electrical energy for the multiple fuel injection sessions does not have to be performed after the initiation of the single energization. Therefore, a time limit on the multiple fuel injection sessions, such as the main injection having to be performed immediately after the pre-injection, can be reduced.

(d) In the fuel injection device 1, the magnitude of the current Ip1 and the duration of the flow of the current Ip1 during the pre-injection can be adjusted in response to vehicle driving situations. Accordingly, an air-fuel mixture that is suitable for desired combustion can be formed in the combustion chamber.

(e) In the fuel injection device 1, a fuel spray length can be shortened while the air-fuel mixture suitable for the desired combustion is formed in the combustion chamber by the fuel injection being performed multiple times. Accordingly, an increase in cooling loss can be prevented that is attributable to a collision between the injected fuel and, for example, an outer wall of a piston and an inner wall of a cylinder block which form the combustion chamber. A reduction in particulate matter generation amount can be achieved as well.

(f) In the fuel injection device 1 according to the first embodiment, the state where the needle 40 and the movable core 50 abut against each other is maintained during the period between the pre-injection and the main injection. Accordingly, the needle 40 and the movable core 50 gently move in the valve-opening direction during the main injection, and thus a collision at a relatively high speed with the bottomed cylindrical member 60 can be prevented even if the needle 40 further moves in the valve-opening direction after the movable core 50 abuts against the fixed core 30. Therefore, rebounding of the needle 40 that takes the form of a movement in the valve-closing direction following a collision with the bottomed cylindrical member 60 can be prevented.

(Second Embodiment)

Hereinafter, a fuel injection device according to a second embodiment of the present disclosure will be described with reference to FIG. 7. The second embodiment differs from the first embodiment in that an intermediate current flows between a period in which a first current flows and a period in which a second current flows. The same reference numerals will be used to refer to portions substantially common to the first embodiment and description thereof will be omitted.

Figure 7:
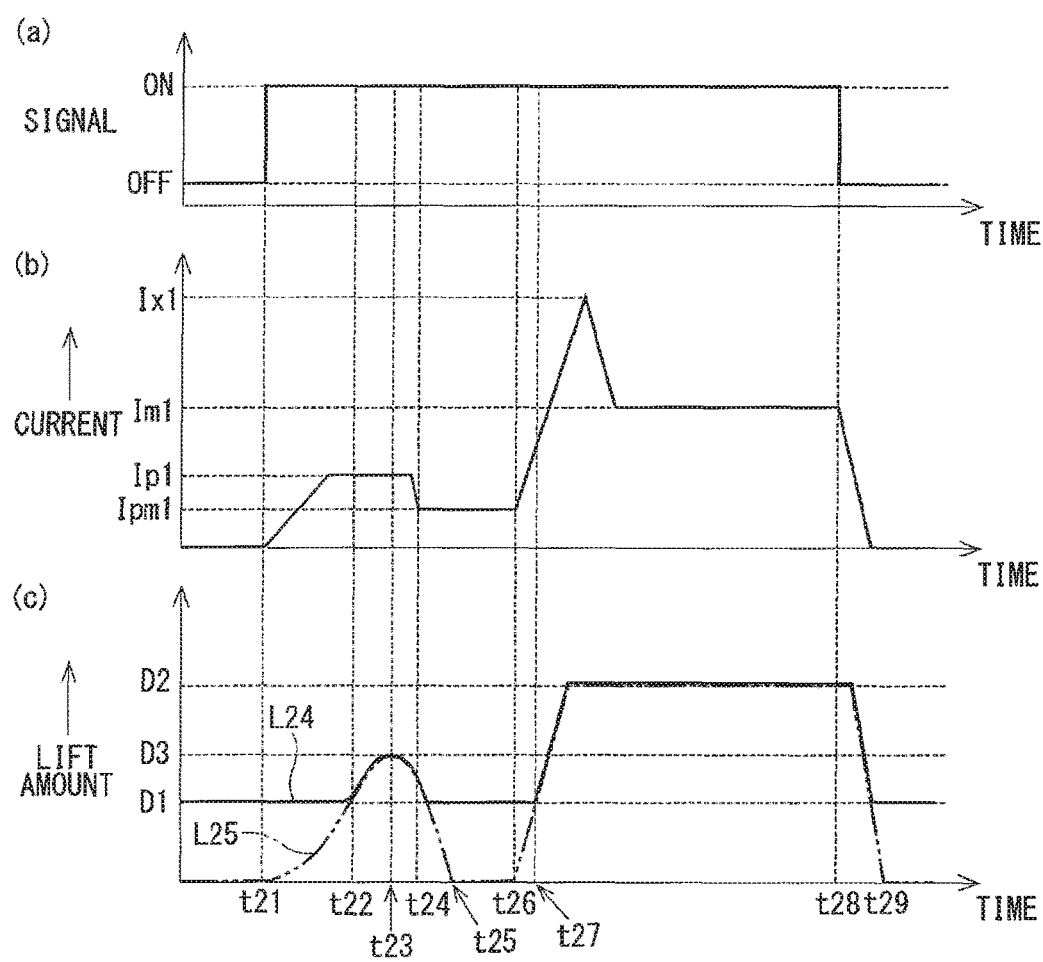
FIG. 7 is a time chart related to fuel injection by a fuel injection device according to a second embodiment of the present disclosure.

A time chart related to fuel injection by the fuel injection device according to the second embodiment is illustrated in FIG. 7. ON and OFF of a signal that is output from an ECU to a current control unit 38 are illustrated in (a) of FIG. 7. A magnitude of a current that flows through a coil 35 is illustrated in (b) of FIG. 7. A lift amount of a needle 40 (solid line L24) and a lift amount of a movable core 50 (two-dot chain line L25) are illustrated in (c) of FIG. 7.

In the fuel injection device according to the second embodiment, a current Ip1 flows through the coil 35 once the signal that the ECU outputs to the current control unit 38 is turned ON at time t21. As a result, the lift amount of the movable core 50 increases as illustrated by the two-dot chain line L25. At this time, the movable core 50 moves in the valve-opening direction, while accelerating over a distance equivalent to the length of a gap 430 in a central axis CA20 direction, and thus a relatively large force in the valve-opening direction acts on the needle 40. Once the relatively large force in the valve-opening direction acts on the needle 40, the needle 40 and a valve seat 255 are separated from each other and injection holes 26 are opened (time t22 in FIG. 7). Once the injection holes 26 are opened, fuel injection is performed as pre-injection.

After the lift amount of the needle 40 becomes a lift amount D3 at time t23, the needle 40 and the movable core 50 move in the valve-closing direction because of a biasing force of a spring 31. At this time, the current control unit 38 turns the current that flows through the coil 35 into a current Ipm1 as an "intermediate current" smaller than the current Ip1 (time t24 in FIG. 7). As a result, the needle 40 and the valve seat 255 moving in the valve-closing direction abut against each other and the needle 40 stops, and then the movable core 50 further moves in the valve-closing direction and abuts against a regulating unit 45. In other words, the lift amount of the movable core 50 becomes zero starting from lime t25, which follows time t24, as illustrated in (c) of FIG. 7.

Once the current control unit 38 increases the current flowing through the coil 35 at time t26 so that the current flowing through the coil 35 changes from the current Ipm1 to a current Ix1, the movable core 50 moves in the valve-opening direction while accelerating through the gap 430 and abuts against a flange portion 43. As a result, the needle 40 subjected to the relatively large force in the valve-opening direction and the valve seat 255 are separated from each other and the injection holes 26 are opened (time t27 in FIG. 7). Once the injection holes 26 are opened, fuel injection is performed as main injection. Then, the current control unit 38 changes the current flowing through the coil 35 from the current Ix1 to a current Im1. The lift amount of the needle 40 at this time is a lift amount D2.

Once the signal that the ECU outputs to the current control unit 38 is turned OFF at time t28 thereafter, the needle 40 and the movable core 50 move in the valve-closing direction. The injection holes 26 are closed and the needle 40 stops by the needle 40 and the valve seat 255 abutting against each other. The movable core 50 further moves in the valve-closing direction and stops by abutting against the regulating unit 45 (time t29 in FIG. 7).

In the fuel injection device according to the second embodiment, the needle 40 can be subjected to the relatively large force in the valve-opening direction during the main injection as well as the pre-injection. Therefore, according to the second embodiment, a combination between the pre-injection and the main injection, which allows valve opening even in a case where a fuel in a housing 20 has a relatively high pressure, can be performed during single energization with effects (a) to (e) of the first embodiment being achieved as they are.

(Third Embodiment)

Hereinafter, a fuel injection device according to a third embodiment of the present disclosure will be described with reference to FIG. 8. The third embodiment differs from the first embodiment in that a pre-current flows ahead of a primary current. The same reference numerals will be used to refer to portions substantially common to the first embodiment and description thereof will be omitted.

Figure 8:
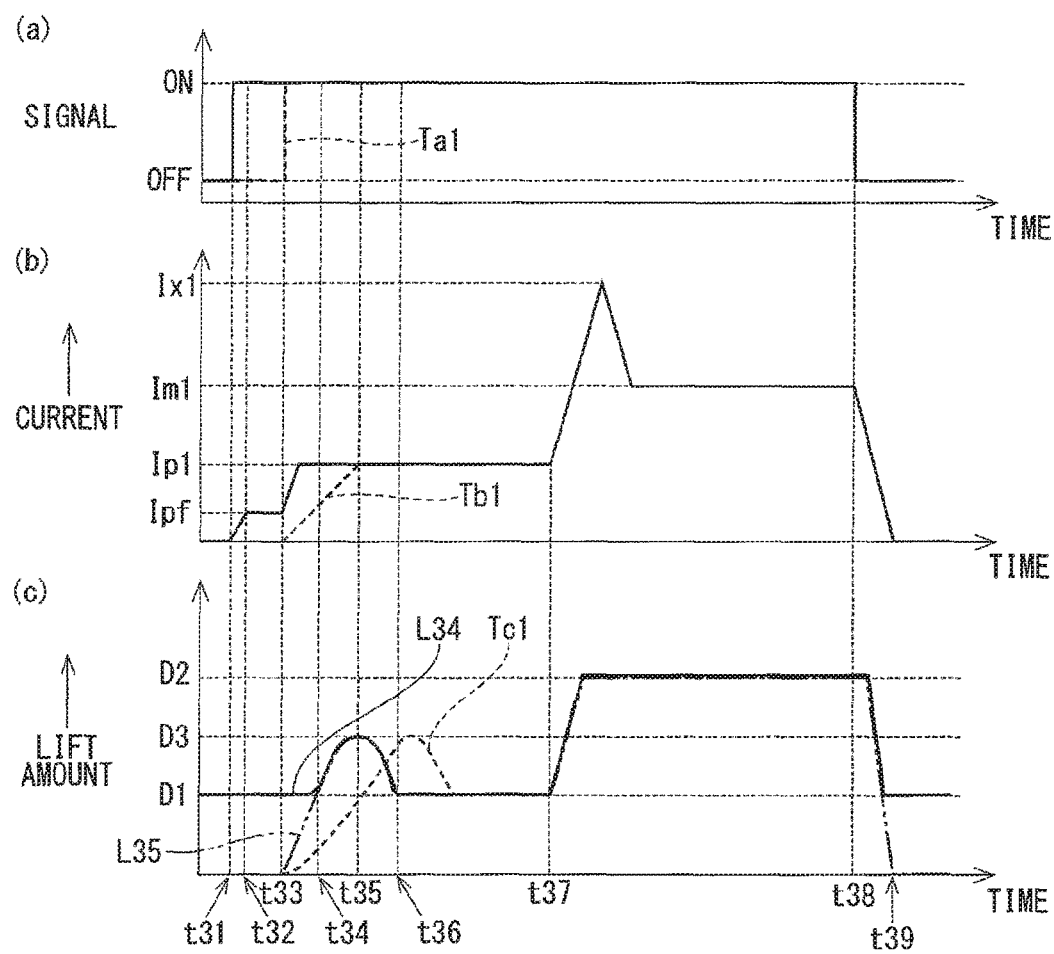
FIG. 8 is a time chart related to fuel injection by a fuel injection device according to a third embodiment of the present disclosure.

A time chart related to fuel injection by the fuel injection device according to the third embodiment is illustrated in FIG. 8. ON and OFF of a signal that is output from an ECU to a current control unit 38 are illustrated in (a) of FIG. 8. A magnitude of a current that flows through a coil 35 is illustrated in (b) of FIG. 8. A lift amount of a needle 40 (solid line L34) and a lift amount of a movable core 50 (two-dot chain line L35) are illustrated in (c) of FIG. 8. In addition, the time chart related to the fuel injection according to the first embodiment is illustrated by dotted lines Ta1, Tb1, and Tc1 in FIG. 8 for comparison to the third embodiment.

In the fuel injection device according to the third embodiment, a current Ipf as the "pre-current" smaller than a current Ip1 flows through the coil 35 (starting from time t32 in FIG. 8) once the signal that the ECU outputs to the current control unit 38 is turned ON at time t31, which is earlier than time t11 according to the first embodiment. In addition, once the current flowing through the coil 35 is changed from the current Ipf to the current Ip1 at time t33, which is simultaneous to time t11 according to the first embodiment, the movable core 50 moves in the valve-opening direction, while accelerating over a distance equivalent to the length of a gap 430 in a central axis CA20 direction, as illustrated by the two-dot chain line L35 in FIG. 8. At this time, a rate at which the current increases between time t33 and time t34 is higher than a rate at which the current according to the first embodiment increases from zero to the current Ip1 (dotted line Tb1 in (b) of FIG. 8). Accordingly, the movable core 50 in the fuel injection device according to the third embodiment abuts against a flange portion 43 at a higher speed than in the first embodiment.

At time t34, injection holes 26 are opened and injection of a fuel in an injection nozzle 25 is performed as pre-injection. After the lift amount of the needle 40 becomes a lift amount D3 at time t35, the needle 40 and the movable core 50 move in the valve-closing direction because of a biasing force of a spring 31, and then the needle 40 and a valve seat 255 abut against each other and the injection holes 26 are closed at time t36 (time t36 in (c) of FIG. 8).

The current Ip1 flows through the coil 35 after the injection holes 26 are closed at time t36, and thus a state where the movable core 50 and the needle 40 abut against each other is maintained.

At time t37, the current control unit 38 turns the current flowing through the coil 35 into a current Ix1, which is larger than the current Ip1, and then turns the current Ix1 into a current Im1. As a result, the movable core 50 and the needle 40 move in the valve-opening direction and the injection holes 26 are opened again. Once the injection holes 26 are opened, injection of the fuel in the injection nozzle 25 is performed as main injection.

Once the signal that the ECU outputs to the current control unit 38 is turned OFF at time t38 thereafter, the needle 40 and the movable core 50 move in the valve-closing direction. The injection holes 26 are closed and the needle 40 stops by the needle 40 and the valve seat 255 abutting against each other. The movable core 50 further moves in the valve-closing direction and stops by abutting against a regulating unit 45 (time t39 in FIG. 8).

As illustrated in (c) of FIG. 8, a rate at which the needle 40 and the movable core 50 in the fuel injection device according to the third embodiment are lifted during the pre-injection can be higher than in the first embodiment illustrated by the dotted line Tc1 in (c) of FIG. 8 by the current Ipf smaller than the current Ip1 flowing before the current Ip1 flows. Therefore, according to the third embodiment, pre-injection initiation time can be put forward with the effects of the first embodiment being achieved as they are.

(Fourth Embodiment)

Hereinafter, a fuel injection device according to a fourth embodiment of the present disclosure will be described with reference to FIG. 9. The fourth embodiment differs from the first embodiment in that a current control unit is capable of controlling a current such that only fuel injection resulting in valve opening through acceleration and abutting of a movable core against a needle is performed during single energization. The same reference numerals will be used to refer to portions substantially common to the first embodiment and description thereof will be omitted.

In the fuel injection device according to the fourth embodiment, a current control unit 38 performs divided injection control or single injection control depending on a command from an ECU, the divided injection control being to perform fuel injection multiple times during the single energization and the single injection control being to perform only fuel injection for valve opening using a gap 430 during the single energization.

Figure 9:
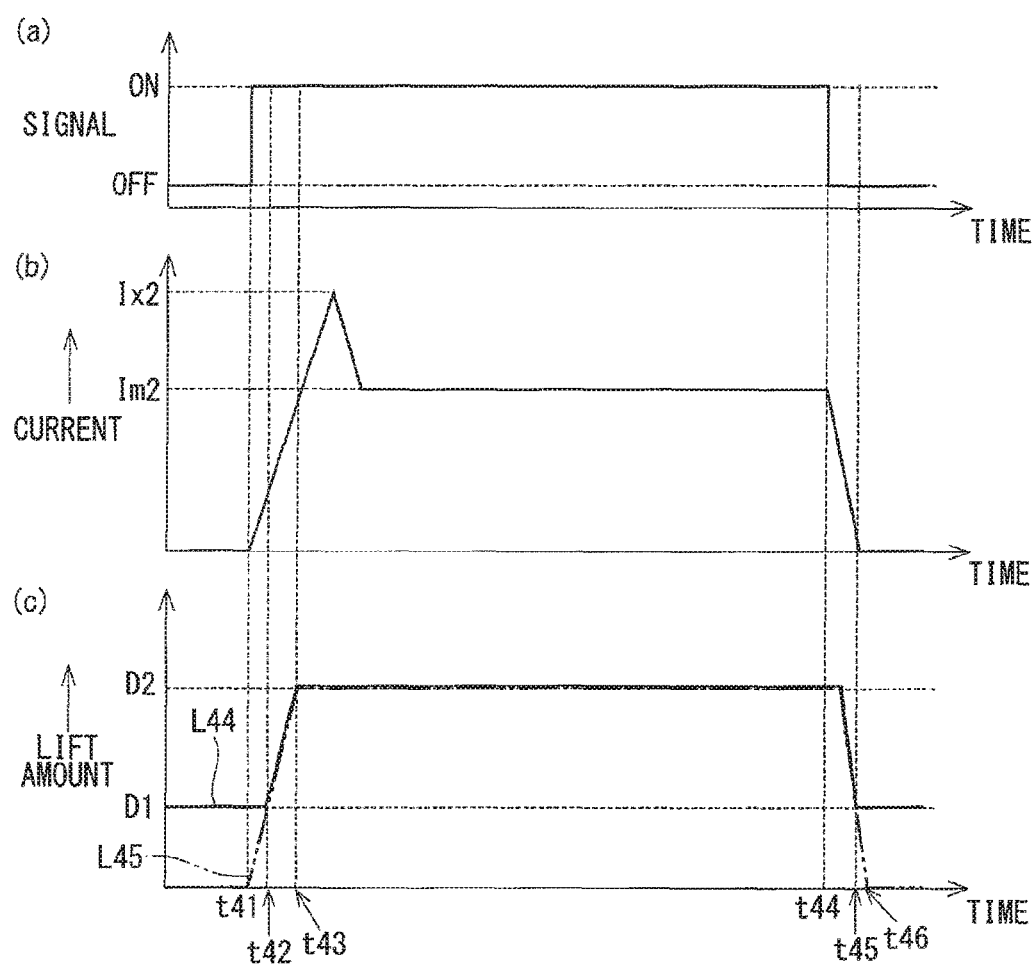
FIG. 9 is a time chart related to fuel injection by a fuel injection device according to a fourth embodiment of the present disclosure.

A time chart related to the fuel injection by the fuel injection device according to the fourth embodiment is illustrated in FIG. 9. The time chart that is illustrated in FIG. 9 is related to the fuel injection regarding the single injection control by the current control unit 38, and the time chart according to the first embodiment is identical to a time chart related to the fuel injection regarding the divided injection control by the current control unit 38.

ON and OFF of a signal that is output from the ECU to the current control unit 38 are illustrated in (a) of FIG. 9. A magnitude of the current that flows through a coil 35 is illustrated in (b) of FIG. 9. A lift amount of a needle 40 (solid line L44) and a lift amount of a movable core 50 (two-dot chain line L45) are illustrated in (c) of FIG. 9.

During the single injection control, a current Ix2 as a "fifth current" flows through the coil 35 first and then a current Im2 flows through the coil 35 once the signal that the ECU outputs to the current control unit 38 is turned ON at time t41. As a result, the movable core 50 moves in the valve-opening direction as illustrated by the two-dot chain line L45, while accelerating over a distance equivalent to the length of the gap 430 in a central axis CA20 direction, and thus a relatively large force in the valve-opening direction acts on the needle 40. After the needle 40 abuts against and is integrated with the movable core 50, the needle 40 moves in the valve-opening direction and injection holes 26 are opened (time t42 in FIG. 9). Once the injection holes 26 are opened, injection of a fuel in an injection nozzle 25 is performed as main injection. A maximum lift amount of the needle 40 at this time is a lift amount D2 (time t43 in FIG. 9). The current Im2 may be equal in magnitude to the current Im1 according to the first embodiment.

Once the signal that the ECU outputs to the current control unit 38 is turned OFF at time t44 thereafter, the needle 40 and the movable core 50 move in the valve-closing direction. The injection holes 26 are closed and the needle 40 stops by the needle 40 and a valve seat 255 abutting against each other (time t45 in FIG. 9). The movable core 50 further moves in the valve-closing direction and stops by abutting against a regulating unit 45 (time t46 in FIG. 9).

In the fuel injection device according to the fourth embodiment, the current control unit 38 performs the fuel injection by switching between small-large double injection control and the single injection control in response to a vehicle driving situation determined by the ECU. Therefore, according to the fourth embodiment, an air-fuel mixture even more suitable for combustion can be formed in the combustion chamber with the effects of the first embodiment being achieved as they are.

(Fifth Embodiment)

Hereinafter, a fuel injection device according to a fifth embodiment of the present disclosure will be described with reference to FIG. 10. The fifth embodiment differs from the first embodiment in that a current control unit controls a current such that after-injection is performed after main injection. The same reference numerals will be used to refer to portions substantially common to the first embodiment and description thereof will be omitted.

In the fuel injection device according to the fifth embodiment, a current control unit 38 performs large-small double injection control for performing the after-injection after the main injection during single energization in response to a command from an ECU, a fuel injection quantity during the after-injection being smaller than a fuel injection quantity during the main injection.

Figure 10:
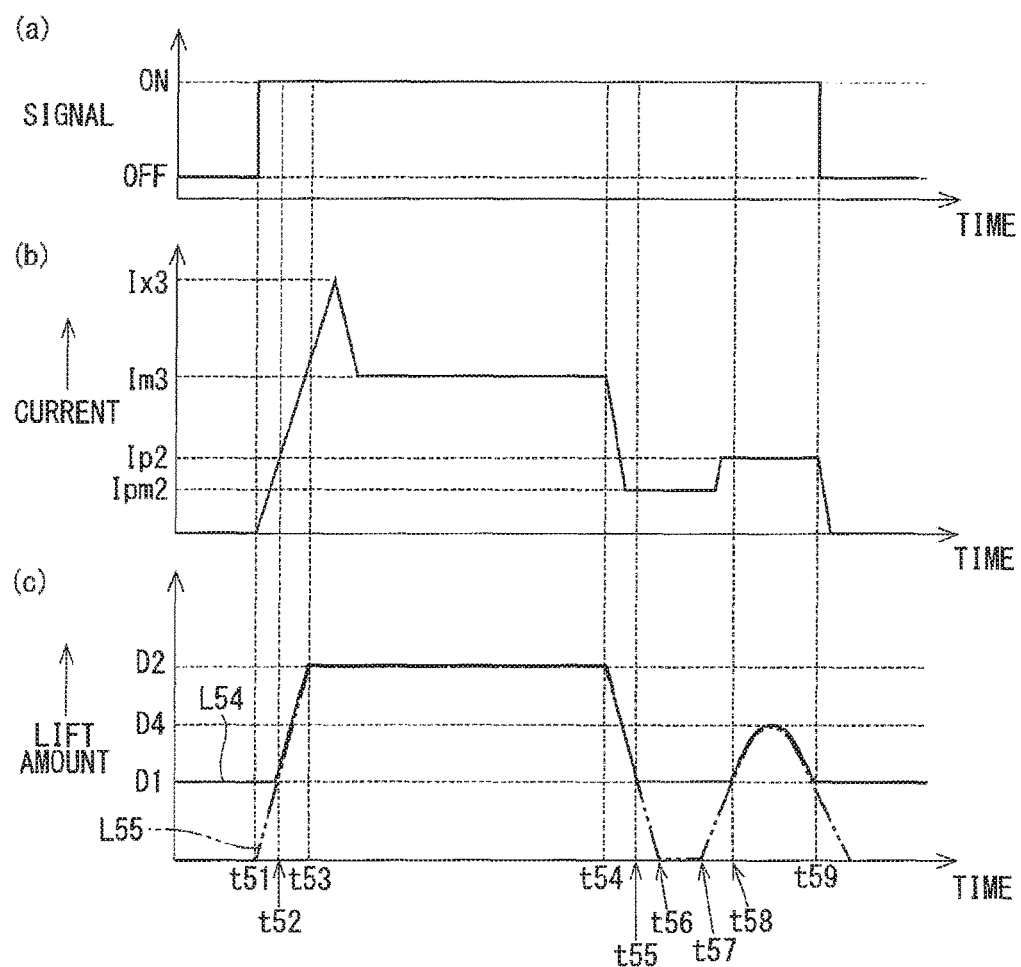
FIG. 10 is a time chart related to fuel injection by a fuel injection device according to a fifth embodiment of the present disclosure.

A time chart related to the fuel injection by the fuel injection device according to the fifth embodiment is illustrated in FIG. 10. ON and OFF of a signal that is output from the ECU to the current control unit 38 are illustrated in (a) of FIG. 10. A magnitude of the current that flows through a coil 35 is illustrated in (b) of FIG. 10. A lift amount of a needle 40 (solid line L54) and a lift amount of a movable core 50 (two-dot chain line L55) are illustrated in (c) of FIG. 10.

In the fuel injection device according to the fifth embodiment, a current Ix3 as a "third current" flows through the coil 35 first and then a current Im3 flows through the coil 35 once the signal that the ECU outputs to the current control unit 38 is turned ON at time t51. As a result, the movable core 50 moves in the valve-opening direction as illustrated by the two-dot chain line L55, while accelerating over a distance equivalent to the length of a gap 430 in a central axis CA20 direction, and thus a relatively large force in the valve-opening direction acts on the needle 40. After the needle 40 abuts against and is integrated with the movable core 50, the needle 40 moves in the valve-opening direction and injection holes 26 are opened (time t52 in FIG. 10). Once the injection holes 26 are opened, injection of a fuel in an injection nozzle 25 is performed as main injection. The lift amount of the needle 40 at this time is a maximum lift amount D2 (time t53 in FIG. 10). The current Im3 may be equal in magnitude to the current Im1 according to the first embodiment.

At time t54, which follows time t53, the current control unit 38 changes the current flowing through the coil 35 from the current Im3 to a current Ipm2. As a result, a magnetic attraction force between a fixed core 30 and the movable core 50 decreases, and thus the needle 40 and the movable core 50 move in the valve-closing direction in a state where the needle 40 and the movable core 50 remain integrated with each other. The injection holes 26 are closed and the needle 40 stops by the needle 40 and a valve seat 255 abutting against each other (time t55 in FIG. 10). The movable core 50 further moves in the valve-closing direction and stops by abutting against a regulating unit 45 (time t56 in FIG. 10).

At time t57, which follows time t56, the current control unit 38 changes the current flowing through the coil 35 into a current Ip2 as a "fourth current". The movable core 50 moves in the valve-opening direction, while accelerating over the distance equivalent to the length of the gap 430 in the central axis CA20 direction, and abuts against the needle 40 (time t58 in FIG. 10). As a result, the injection holes 26 are opened and the fuel in the injection nozzle 25 is injected. Hereinafter, the fuel injection at a time when the current Ip2 flows through the coil 35 will be referred to as the after-injection. In the fuel injection device according to the fifth embodiment, the current control unit 38 is capable of adjusting a magnitude of the current Ip2 and a duration of the flow of the current Ip2 in response to vehicle driving situations.

After the needle 40 is separated from the valve seat 255 at time t58, the needle 40 lifted by a lift amount D4, which is smaller than the lift amount D2, and the movable core 50 move in the valve-closing direction because of a biasing force of a spring 31 and the needle 40 and the valve seat 255 abut against each other.

The magnetic attraction force between the fixed core 30 and the movable core 50 disappears once the signal that the ECU outputs to the current control unit 38 is turned OFF at time t59, and thus the movable core 50 moves in the valve-closing direction and abuts against the regulating unit 45.

In the fuel injection device according to the fifth embodiment, the current control unit 38 performs the large-small double injection control for the after-injection to be performed after the main injection during which the lift amount of the needle 40 is maximized. Therefore, according to the fifth embodiment, an air-fuel mixture even more suitable for combustion can be formed in the combustion chamber after the main injection with the effects of the first embodiment being achieved as they are.

(Another Embodiment)

(A) In the embodiments described above, the fuel injection device performs gasoline injection. According to another embodiment of the present disclosure, a fuel that is injected by a fuel injection device may be light oil.

In a case where the fuel injection device according to the present disclosure is disposed in a diesel engine using the light oil as a fuel, fuel injection can be performed multiple times during the "single energization" in the fuel injection device according to the present disclosure unlike in the fuel injection device according to the related art in which valve opening is performed with electricity being charged for each of multiple fuel injection sessions, and thus the number of times of electricity charging can be reduced. Accordingly, the amount of the energy that is required for the fuel injection can be reduced.

(B) In the embodiments described above, fuel injection is performed twice during the single energization. However, the number of the fuel injection sessions in the single energization is not limited thereto.

Figure 11:
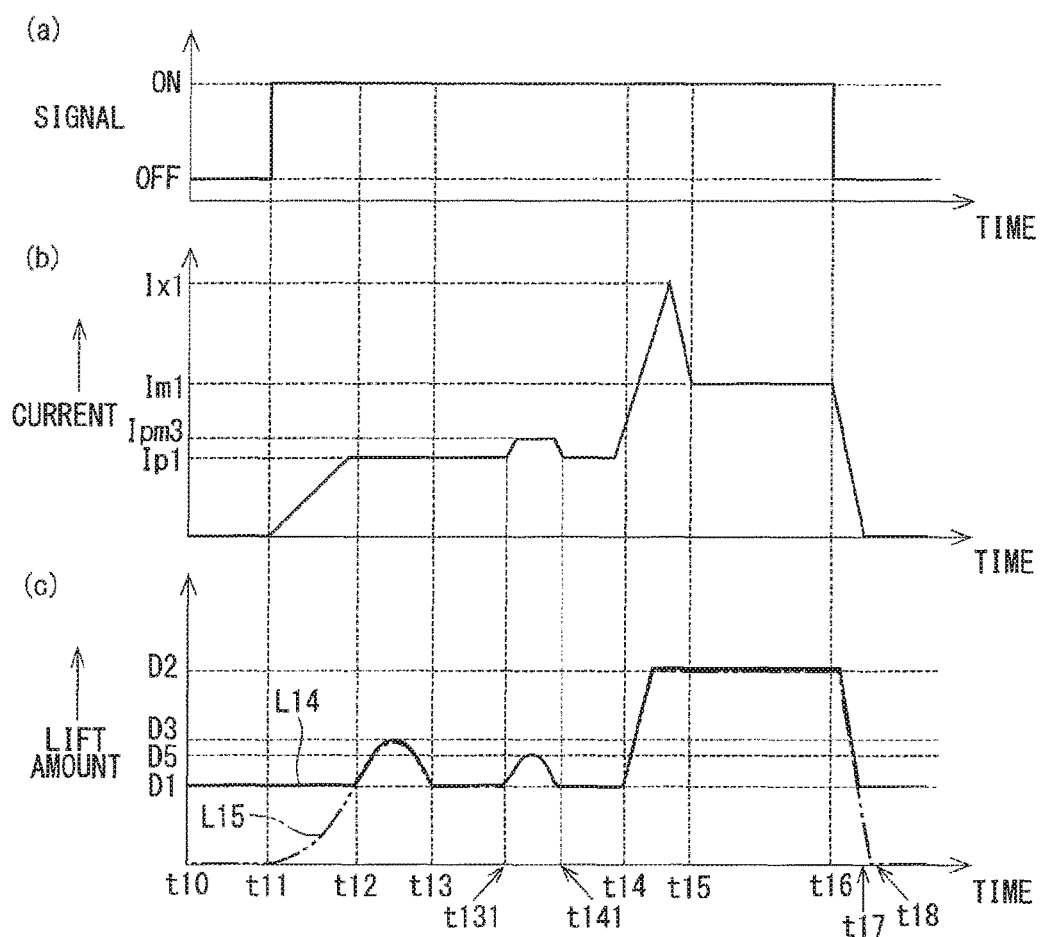
FIG. 11 is a time chart related to fuel injection by a fuel injection device according to another embodiment of the present disclosure.

Fuel injection by a fuel injection device as a modification example of the first embodiment will be described with reference to a time chart illustrated in FIG. 11. A current control unit in the fuel injection device as the modification example changes the current flowing through the coil from the current Ip1 to a current Ipm3, which exceeds the current Ip1, between time t13 and time t14 (between time t131 and time t141 in FIG. 11). As a result, the needle is separated from the valve seat and second pre-injection that has a lift amount of D5 can be performed subsequently to first pre-injection (fuel injection between time 112 and time 113 in FIG. 11). Accordingly, an air-fuel mixture even more suitable for combustion can be formed in the combustion chamber. The lift amount D5 may be equal to the lift amount D3 according to the first embodiment.

(C) In the first to third embodiments, the current control unit performs the small-large double injection control. In the fourth embodiment, the current control unit performs the small-large double injection control or the single injection control depending on the vehicle driving situation determined by the ECU. In the fifth embodiment, the current control unit performs the large-small double injection control. However, the injection control that is performed by the current control unit is not limited thereto. The large-small double injection control according to the first embodiment and the small-large double injection control according to the fifth embodiment may be switch-executed depending on the vehicle driving situation determined by the ECU. In addition, the large-small double injection control according to the first embodiment, the small-large double injection control according to the fifth embodiment, and the single injection control according to the fourth embodiment may be switch-executed depending on the vehicle driving situation determined by the ECU.

(D) In the embodiments described above, the magnitude of the current and the duration of the current flow during the pre-injection are adjusted in response to vehicle driving situations. In the other embodiment of the present disclosure, the magnitude of the current and the duration of the current flow may not be adjusted. In addition, at least only one of the magnitude of the current and the duration of the current flow may be adjusted.

(E) The embodiments described above are provided with the bottomed cylindrical member that regulates the needle lift amount when the needle is lifted. The other embodiment of the present disclosure may be provided with no bottomed cylindrical member.

(F) In the embodiments described above, the fixed core main body portion and the fixed core abutting portion constitute the fixed core. The other embodiment of the present disclosure may be provided with no fixed core abutting portion.

(G) In the bottomed cylindrical member according to the embodiments described above, the inner wall of the cylinder portion slides with respect to the outer wall of the flange portion and the outer wall of the cylinder portion slides with respect to the inner wall of the fixed core abutting portion. In the other embodiment of the present disclosure, the inner wall and the outer wall of the cylinder portion may not slide with respect to the outer wall of the flange portion and the inner wall of the fixed core abutting portion, respectively.

(H) In the embodiments described above, the flange portion and the regulating unit are formed in the substantially toric shape. However, the shape of the flange portion and the regulating unit is not limited thereto. The shape may be an elliptical cylindrical shape or a polygonal cylindrical shape, and the flange portion and the regulating unit may be disposed in a protruding shape at a part in the circumferential direction of the shaft portion.

(I) In the embodiments described above, the regulating unit is disposed radially outside the shaft portion. The regulating unit may be disposed on an inner wall of the housing as well.

The present disclosure is not limited to the embodiments and can be carried out in various forms without departing from the gist of the present disclosure.

The invention claimed is:

1. A fuel injection device supplying a fuel into a combustion chamber of an internal combustion engine by injecting the fuel, the fuel injection device comprising:
    a housing including an injection hole and a valve seat, the injection hole being formed at one end in a central axis direction and injecting the fuel and the valve seat being formed around the injection hole;
    a needle member disposed to be capable of a reciprocating movement in the housing and opening and closing the injection hole by performing valve closing when one end portion abuts against the valve seat and performing valve opening when the end portion is separated from the valve seat;
    a flange portion disposed radially outside the other end portion side of the needle member to be capable of an integrated reciprocating movement with the needle member;
    a movable core disposed on the valve seat side of the flange portion to be capable of moving relative to the needle member;
    a regulating unit disposed radially outside the needle member or on an inner wall of the housing to be capable of an integrated reciprocating movement with the needle member on the valve seat side of the movable core, the regulating unit being capable of regulating a movement of the movable core in a valve-closing direction by abutting against the movable core;
    a fixed core disposed on a side of the movable core opposite to the valve seat and fixed to the housing;
    a coil forming a magnetic field when a current flows such that the movable core is attracted to the fixed core;
    a biasing unit biasing the needle member in the valve-closing direction; and
    a current control unit controlling the current flowing through the coil,
    wherein a gap is formed between the flange portion and the movable core when the regulating unit and the movable core abut against each other, and
    wherein the current control unit is capable of adjusting a magnitude of the current flowing through the coil to perform a plurality of single fuel injections during single energization in which a current begins to flow through the coil and continues exceeding zero until becoming zero,
    in each of the plurality of single fuel injections, the needle abutting against the valve seat is separated from the valve seat to inject fuel through the injection hole and again abuts against the valve seat,
    the plurality of single fuel injections include at least two single fuel injections including a first fuel injection and a second fuel injection,
    the current control unit is configured:
        to adjust the magnitude of the current at a first current to perform the first single fuel injection, and
        to adjust the magnitude of the current at a second current to perform the second single fuel injection,
    the first current is lower than a maximum value of the second current.

2. The fuel injection device according to claim 1, wherein the current control unit is capable of executing at least one of small-large double injection control and large-small double injection control as the plurality of single fuel injections, the small-large double injection control being control for the single fuel injection to be performed twice during the single energization by the first current being caused to flow such that a needle member lift amount becomes a lift amount smaller than a maximum needle member lift amount and then the second current being caused to flow such that the needle member lift amount becomes the maximum lift amount, and the large-small double injection control being control for the single fuel injection to be performed twice during the single energization by a third current being caused to flow such that the needle member lift amount becomes the maximum lift amount and then a fourth current being caused to flow such that the needle member lift amount becomes the lift amount smaller than the maximum needle member lift amount.

3. The fuel injection device according to claim 2, wherein the current control unit causes an intermediate current smaller than the first current to flow between a period in which the first current flows and a period in which the second current flows during the small-large double injection control.

4. The fuel injection device according to claim 2, wherein the current control unit is capable of adjusting the magnitude of the first current during the small-large double injection control.

5. The fuel injection device according to claim 2, wherein the current control unit is capable of adjusting a duration of the flow of the first current during the small-large double injection control.

6. The fuel injection device according to claim 4, wherein the current control unit adjusts at least one of the magnitude of the first current and the duration of the flow of the first current during the small-large double injection control in response to a driving situation regarding a vehicle equipped with the internal combustion engine.

7. The fuel injection device according to claim 2, wherein the current control unit causes a pre-current smaller than the first current to flow before the flow of the first current during the small-large double injection control.

8. The fuel injection device according to claim 2, wherein the current control unit is capable of adjusting the magnitude of the fourth current during the large-small double injection control.

9. The fuel injection device according to claim 2, wherein the current control unit is capable of adjusting a duration of the flow of the fourth current during the large-small double injection control.

10. The fuel injection device according to claim 2, wherein
    the current control unit is capable of executing single injection control for the single fuel injection to be performed once during the single energization by causing a fifth current to flow, the fifth current allowing the movable core to abut against the flange portion while accelerating by using the gap.

11. The fuel injection device according to claim 10, wherein
    the current control unit is capable of switch-executing the small-large double injection control, the single injection control, and the large-small double injection control in response to the driving situation regarding the vehicle equipped with the internal combustion engine.

12. The fuel injection device according to claim 1, wherein
    the current control unit is capable of performing a first one of the plurality of single fuel injections by causing the first current to flow through the coil in the single energization to accelerate the movable core in the gap to cause the movable core to abut against the flange portion to move both the needle and the movable core in the valve-opening direction in an integrated manner against the biasing force of the spring to open the injection hole, and subsequently to cause the needle and the movable core to move in the valve-closing direction by the biasing force of the spring to close the injection hole.

13. The fuel injection device according to claim 12, wherein
the current control unit is capable of performing a second one of the plurality of single fuel injections during the single energization by causing the second current to flow through the coil after the first one of the single injection, which is completed by abutting the needle again against the valve seat.

14. The fuel injection device according to claim 1, wherein the current control unit is configured to control the magnitude of the current flowing through the coil without decreasing the current between a first one of the plurality of single fuel injections and a second one of the plurality of single fuel injections during the single energization.

15. The fuel injection device according to claim 14, wherein the current control unit is configured to control the magnitude of the current flowing through the coil to be constant between the first one of the plurality of single fuel injections and the second one of the plurality of single fuel injections during the single energization.

16. The fuel injection device according to claim 1, wherein
the current control unit is configured to adjust the magnitude of the current flowing through the coil, during the single energization, to increase the current gradually as time elapses to the first current to cause a first one of the plurality of single fuel injections, to maintain the current constantly at the first current without decreasing, and to increase again the current gradually as time elapses to a second current value to cause a second one of the plurality of single fuel injections after completion of the first one of the single fuel injection.

17. The fuel injection device according to claim 1, wherein
the current control unit is configured to adjust the magnitude of the current flowing through the coil, during the single energization, to increase the current linearly as time elapses to the first current to cause a first one of the plurality of single fuel injections, to maintain the current constantly at the first current without decreasing, and to increase again the current linearly as time elapses to a second current value to cause a second one of the plurality of single fuel injections after completion of the first one of the plurality of single fuel injections.

18. The fuel injection device according to claim 1, wherein
the current control unit is configured to adjust the magnitude of the current flowing through the coil, during the single energization, to increase the current at a first rate of increase to the first current to cause a first one of the plurality of single fuel injections, and to increase the current at a second rate of increase to a second current value to cause a second one of the plurality of single fuel injections after completion of the first one of the plurality of single fuel injections, and the second rate of increase is greater than the first rate of increase.

19. The fuel injection device according to claim 1, wherein
the current control unit is configured to execute a small-large double injection control, the small-large double injection control being control for the plurality of single fuel injections to be performed twice during the single energization by the first current being caused to flow for a small injection control such that a needle member lift amount becomes a lift amount smaller than a maximum needle member lift amount and then a second current being caused to flow for a large injection control such that the needle member lift amount becomes the maximum lift amount; and
the current control unit is configured to control the magnitude of the current flowing through the coil so that the current does not reach a level of the second current prior to performance of the small injection control.

20. A fuel injection device supplying a fuel into a combustion chamber of an internal combustion engine by injecting the fuel, the fuel injection device comprising:
a housing including an injection hole and a valve seat, the injection hole being formed at one end in a central axis direction and injecting the fuel and the valve seat being formed around the injection hole;
a needle member disposed to be capable of a reciprocating movement in the housing and opening and closing the injection hole by performing valve closing when one end portion abuts against the valve seat and performing valve opening when the end portion is separated from the valve seat;
a flange portion disposed radially outside the other end portion side of the needle member to be capable of an integrated reciprocating movement with the needle member;
a movable core disposed on the valve seat side of the flange portion to be capable of moving relative to the needle member;
a regulating unit disposed radially outside the needle member or on an inner wall of the housing to be capable of an integrated reciprocating movement with the needle member on the valve seat side of the movable core, the regulating unit being capable of regulating a movement of the movable core in a valve-closing direction by abutting against the movable core;
a fixed core disposed on a side of the movable core opposite to the valve seat and fixed to the housing;
a coil forming a magnetic field when a current flows such that the movable core is attracted to the fixed core;
a biasing unit biasing the needle member in the valve-closing direction; and
a current control unit controlling the current flowing through the coil,
wherein a gap is formed between the flange portion and the movable core when the regulating unit and the movable core abut against each other, and
wherein the current control unit is capable of adjusting a magnitude of the current flowing through the coil to perform a plurality of single fuel injections during single energization in which a current begins to flow through the coil and continues exceeding zero until becoming zero,
in each of the plurality of single fuel injections, the needle abutting against the valve seat is separated from the valve seat to inject fuel through the injection hole and again abuts against the valve seat, the plurality of single fuel injections include at least two single fuel injections including a first fuel injection and a second fuel injection, the current control unit is configured:
to adjust the magnitude of the current at a first current to perform the first single fuel injection, and
to adjust the magnitude of the current at a second current to perform the second single fuel injection, the second current is lower than a maximum value of the first current.

21. A fuel injection device supplying a fuel into a combustion chamber of an internal combustion engine by injecting the fuel, the fuel injection device comprising:
a housing including an injection hole and a valve seat, the injection hole being formed at one end in a central axis direction and injecting the fuel and the valve seat being formed around the injection hole;
a needle member disposed to be capable of a reciprocating movement in the housing and opening and closing the injection hole by performing valve closing when one end portion abuts against the valve seat and performing valve opening when the end portion is separated from the valve seat;
a flange portion disposed radially outside the other end portion side of the needle member to be capable of an integrated reciprocating movement with the needle member;
a movable core disposed on the valve seat side of the flange portion to be capable of moving relative to the needle member;
a regulating unit disposed radially outside the needle member or on an inner wall of the housing to be capable of an integrated reciprocating movement with the needle member on the valve seat side of the movable core, the regulating unit being capable of regulating a movement of the movable core in a valve-closing direction by abutting against the movable core;
a fixed core disposed on a side of the movable core opposite to the valve seat and fixed to the housing;
a coil forming a magnetic field when a current flows such that the movable core is attracted to the fixed core;
a biasing unit biasing the needle member in the valve-closing direction; and
a current control unit controlling the current flowing through the coil,
wherein a gap is formed between the flange portion and the movable core when the regulating unit and the movable core abut against each other, and
wherein the current control unit is capable of adjusting a magnitude of the current flowing through the coil to perform a plurality of single fuel injections during single energization in which a current begins to flow through the coil and continues exceeding zero until becoming zero,
in each of the plurality of single fuel injections, the needle abutting against the valve seat is separated from the valve seat to inject fuel through the injection hole and again abuts against the valve seat,
the plurality of single fuel injections include at least two single fuel injections including a first fuel injection and a second fuel injection, the current control unit is configured:
to adjust the magnitude of the current at a first current to perform the first single fuel injection, and
to maintain the magnitude of the current constantly at the first current during the first single fuel injection.

22. The fuel injection device according to claim 20, wherein
the current control unit is capable of executing at least one of small-large double injection control and large-small double injection control as the plurality of single fuel injections, the small-large double injection control being control for the single fuel injection to be performed twice during the single energization by the first current being caused to flow such that a needle member lift amount becomes a lift amount smaller than a maximum needle member lift amount and then the second current being caused to flow such that the needle member lift amount becomes the maximum lift amount, and the large-small double injection control being control for the single fuel injection to be performed twice during the single energization by a third current being caused to flow such that the needle member lift amount becomes the maximum lift amount and then a fourth current being caused to flow such that the needle member lift amount becomes the lift amount smaller than the maximum needle member lift amount.

23. The fuel injection device according to claim 22, wherein
the current control unit causes an intermediate current smaller than the first current to flow between a period in which the first current flows and a period in which the second current flows during the small-large double injection control.

24. The fuel injection device according to claim 22, wherein
the current control unit is capable of adjusting the magnitude of the first current during the small-large double injection control.

25. The fuel injection device according to claim 22, wherein
the current control unit is capable of adjusting a duration of the flow of the first current during the small-large double injection control.

26. The fuel injection device according to claim 24, wherein
the current control unit adjusts at least one of the magnitude of the first current and the duration of the flow of the first current during the small-large double injection control in response to a driving situation regarding a vehicle equipped with the internal combustion engine.

27. The fuel injection device according to claim 22, wherein
the current control unit causes a pre-current smaller than the first current to flow before the flow of the first current during the small-large double injection control.

28. The fuel injection device according to claim 22, wherein
the current control unit is capable of adjusting the magnitude of the fourth current during the large-small double injection control.

29. The fuel injection device according to claim 22, wherein
the current control unit is capable of adjusting a duration of the flow of the fourth current during the large-small double injection control.

30. The fuel injection device according to claim 22, wherein
the current control unit is capable of executing single injection control for the single fuel injection to be performed once during the single energization by causing a fifth current to flow, the fifth current allowing the movable core to abut against the flange portion while accelerating by using the gap.

31. The fuel injection device according to claim 30, wherein
the current control unit is capable of switch-executing the small-large double injection control, the single injection control, and the large-small double injection control in response to the driving situation regarding the vehicle equipped with the internal combustion engine.

32. The fuel injection device according to claim 20, wherein
the current control unit is capable of performing a first one of the plurality of single fuel injections by causing the first current to flow through;
the coil in the single energization to accelerate the movable core in the gap to cause the movable core to abut against the flange portion to move both the needle and the movable core in the valve-opening direction in an integrated manner against the biasing force of the spring to open the injection hole, and subsequently to cause the needle and the movable core to move in the valve-closing direction by the biasing force of the spring to close the injection hole.

33. The fuel injection device according to claim 32, wherein
the current control unit is capable of performing a second one of the plurality of single fuel injections during the single energization by causing the second current to flow through the coil after the first one of the single injection, which is completed by abutting the needle again against the valve seat.

34. The fuel injection device according to claim 20, wherein
a maximum value of the second current is lower than a maximum value of the first current.

35. The fuel injection device according to claim 1, wherein
a maximum value of the first current is lower than a maximum value of the second current.

* * * * *